UNITED STATES PATENT OFFICE.

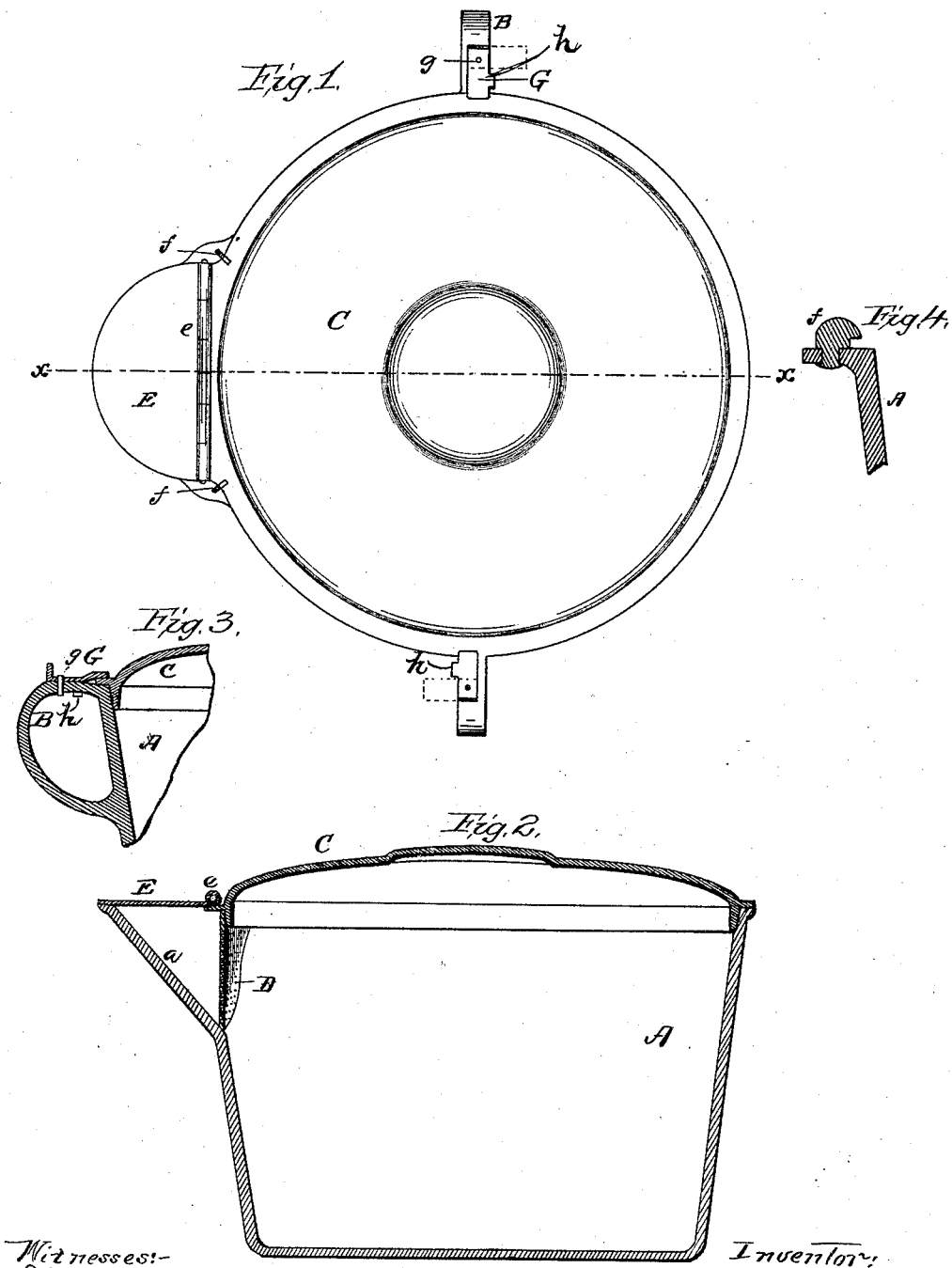

AUGUST W. OBERMANN, OF PITTSBURG, PENNSYLVANIA.

COOKING UTENSIL.

SPECIFICATION forming part of Letters Patent No. 418,216, dated December 31, 1889.

Application filed June 5, 1888. Serial No. 276,163. (No model.)

*To all whom it may concern:*

Be it known that I, AUGUST W. OBERMANN, a citizen of the United States of America, residing at Pittsburg, in the county of Allegheny and State of Pennsylvania, have invented certain new and useful Improvements in Cooking Utensils, of which the following is a specification, reference being had therein to the accompanying drawings.

This invention relates to devices for securing the lids to cooking vessels, and more particularly to such vessels having rigid side handles; and my invention consists of the novel devices and combinations of devices, hereinafter described and specifically claimed.

In the accompanying drawings, Figure 1 represents a plan view of the cooking-vessel with its lid secured in position, and Fig. 2 a vertical section on line $x$ $x$ in Fig. 1. Fig. 3 is a sectional view of the bolt or buckle attachment to the handle for locking the lid to the vessel. Fig. 4 is a detached sectional view of one of the hook-lugs, secured upon the vessel right and left of the spout thereof for receiving and holding the forward edge of the lid.

Corresponding letters in the several figures of the drawings designate like parts.

A denotes the cooking-vessel, having spout $a$ and side handles B.

C is the lid, the rim of which enters the top of vessel A to form a close joint therewith, and has a horizontally-extending rim-flange overlapping the top edge of such vessel. This lid C has secured in a rectangular position therewith a perforated plate D, conforming in shape with the spout $a$, adapted to enter the same and form a strainer thereto, and in line with said strainer D the lid C has attached by a hinge-connection $e$ $e$ a flap E, that provides a cover for said spout. The lid C is secured upon the vessel A by its rim-flange right and left of flap E, being inserted under hook-lugs $f$, secured upon the vessel A by riveting or otherwise, and by catches G, secured to handle B by pivots $g$, to be swung like turn-buckles, and provided with a projecting end to rest upon the lid and straps $h$ to rest under the handles when the projecting ends are turned over the lid. These catches are operated and held in position with the thumbs while lifting the vessel by its handles, thus securely holding the lid C while discharging the liquid contents from the vessel.

What I claim is—

The combination, with a vessel A, having fixed handles B, having straight upper sides on a level with the top of the vessel, and a cover C, having a horizontal flange to rest on top of the vessel, and the catch G, pivoted to the handle and provided with a projecting end to rest upon the lid and a strap to rest under the handle, as set forth.

In testimony whereof I affix my signature in presence of two witnesses.

AUGUST W. OBERMANN.

Witnesses:
   WM. H. LOTZ,
   OTTO LUBKERS.